United States Patent [19]

Abrams et al.

[11] Patent Number: 4,995,337
[45] Date of Patent: Feb. 26, 1991

[54] CAGE FEEDER WITH NOVEL CAGE ATTACHMENT MEANS

[75] Inventors: Lionel Abrams, 10 Dawes Road, Toronto, Ontario, Canada, M4C 5A7; Arthur Fisher; Ronald F. Jameson, both of Markham, Canada

[73] Assignee: Lionel Abrams, Toronto, Canada

[21] Appl. No.: 488,882

[22] Filed: Mar. 6, 1990

[51] Int. Cl.⁵ .............................................. A01K 39/01
[52] U.S. Cl. .................................................... 119/18
[58] Field of Search ..................... 119/18, 72, 72.5, 61; 248/222.2, 222.3, 214, 215, 340; D30/121–133

[56] References Cited

U.S. PATENT DOCUMENTS

| | | | |
|---|---|---|---|
| 1,239,151 | 9/1917 | Woods | 119/18 |
| 1,886,015 | 11/1932 | Henning et al. | 119/18 |
| 3,554,165 | 1/1971 | Carter | 119/18 |
| 3,789,800 | 2/1974 | Steudler, Jr. | 119/18 |
| 4,389,977 | 6/1983 | Borak | 119/18 |
| 4,418,496 | 12/1983 | Koistinen | 248/215 X |
| 4,669,421 | 6/1987 | Flintjer | 119/18 |

FOREIGN PATENT DOCUMENTS

| | | | |
|---|---|---|---|
| 0249196 | 9/1962 | Australia | 119/18 |
| 2231978 | 1/1974 | Fed. Rep. of Germany | 119/18 |
| 0800654 | 8/1958 | United Kingdom | 119/18 |

Primary Examiner—Robert P. Swiatek
Assistant Examiner—Todd E. Manahan
Attorney, Agent, or Firm—Smart & Biggar

[57] ABSTRACT

An integrally formed small animal cage feeder has resilient tabs extending from the side of the feed cup. Each tab comprises a narrow neck joined at one end to the feed cup and at its other end to a head which is enlarged transversely of the neck. The tabs may be deflected and snapped between adjacent bars of a vertical bar cage. In a horizontal bar cage, the tabs may be placed between horizontal bars and, in one embodiment, the head of the tabs turned through ninety degrees to twist the neck of each tab beyond its resilient limit. In a second embodiment, the tab may rest on one horizontal bar and be deflected so that it passes back over the adjacent lower horizontal bar and, due to its resilience, remain so deflected.

9 Claims, 2 Drawing Sheets

CAGE FEEDER WITH NOVEL CAGE ATTACHMENT MEANS

This invention relates to a small animal cage feeder with novel cage attachment means.

One known small animal cage feeder is integrally formed of a stiff plastic. This feeder has a protrusion extending from one side of the feed cup proximate the mouth of the cup. The protrusion tapers toward its free end and has a number of transverse ridges along its length. The protrusion may be inserted between adjacent vertical bars of a vertical bar cage. The continued insertion toward the larger basal end of the protrusion will result in one of the transverse ridges first contacting, and then deforming, the bars. Further insertion will result in the bars snapping back into place behind the ridge whereupon the vertical bars will be sandwiched between adjacent ridges of the protrusion.

One drawback of such a feeder is that the protrusion must be stiff in order to deform the bars of the cage which suggests a heavier gage plastic and, hence, an increased cost of construction. Another drawback is that since the ridges must deform the bars of the cage, their height is limited since they must not bend the bars beyond their resilient limit or damage the weld joints of the cage. Accordingly, there is a risk that an animal may place a sufficient force on the feeder to dislodge it.

The subject invention seeks to overcome drawbacks of the prior art by providing a cage feeder which is of a low cost construction and so may be disposable and which resists dislodging by a small animal in the cage with Which it is associated.

Accordingly, the present invention comprises a small animal cage feeder comprising: a feed holding means; at least one resilient protrusion extending from said feed holding means comprising a neck joined at one end to said feed holding means and terminating at its other end in an enlarged head, said enlarged head enlarged transversely of said neck so as to have a greater extent than the horizontal distance between adjacent vertical bars in a vertical bar cage with which the cage feeder is intended to be used and so that the distance between one side of said neck and the distal side of said head is greater than the vertical distance between adjacent horizontal bars in a horizontal bar cage with which the cage feeder is intended to be used said neck having a resilient limit and said head being turnable about the axis of said neck in order to twist said neck beyond its resilient limit in order to reorient said head with respect to said feed holding means whereby, in a vertical bar animal cage, the enlarged head of said at least one protrusion may be deflected to snap between adjacent vertical bars so that such bars are positioned on either side of the neck of said at least one protrusion and are sandwiched between the base of the enlarged head and the feed holding means and thereafter the animal cage feeder may be lowered so that said neck rests on a horizontal support bar of the cage and whereby, in a horizontal bar animal cage, said at least one protrusion may be inserted between two horizontal bars and rested upon the lower of the two horizontal bars and the enlarged head turned about the axis of said neck to twist said neck beyond its resilient limit so that said head has a new orientation which is such that said two horizontal bars are positioned on either side of the neck of said at least one protrusion and are sandwiched between the base of the enlarged head and the feed holding means.

In the figures which describe example embodiments of the invention:

Figure 1:
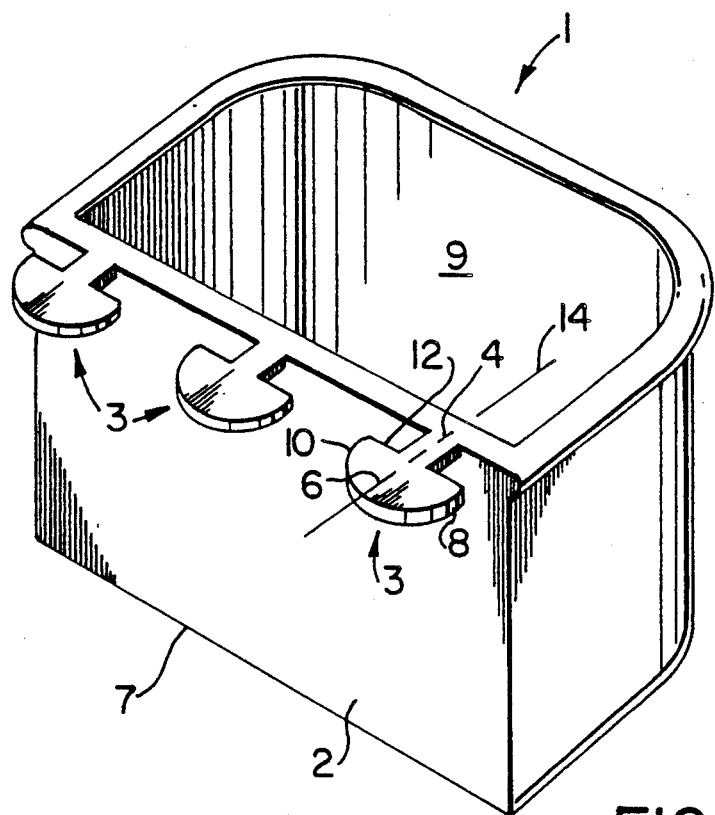
FIG. 1 is a perspective view of a cage feeder made in accordance with this invention.
Figure 2:
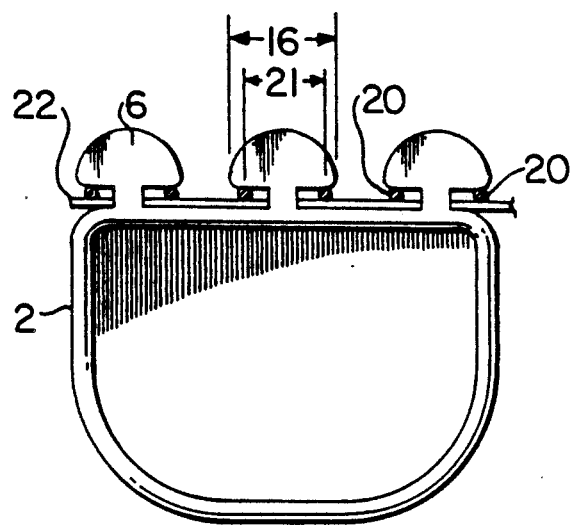
FIG. 2 is a plan view of the feeder of FIG. 1 showing the feeder mounted to a vertical bar cage.

Turning now to FIG. 1, the cage feeder 1 comprises a feed holding means 2 which is a feed cup having a base 7 and a mouth 9 and three resilient protrusions which are tabs 3 extending from one side of the feed cup proximate the mouth 9 of the feed cup. Each resilient protrusion comprises a neck 4 joined at one end to the feed cup and terminating at its other end in an enlarged head 6. The head is enlarged transversely of the neck, in a plane parallel to the mouth 9 of the feed cup and in the direction of sides 8 and 10 of the head, so that the transverse extent 16 of the head is greater than the horizontal distance 21 between adjacent vertical bars 20 of the cage as shown in FIG. 2. The head has a generally half circular outline in plan view, with the flat side of the head comprising the base of the head 12 which is joined to the neck. The cage feeder is integrally formed of a resilient material, preferably polyvinyl chloride. The resilient material has a resilient limit such that if a head is turned through ninety degrees about the central longitudinal axis 14 of a neck 4, the neck will be twisted beyond its resilient limit so that the head will retain this new orientation, which is perpendicular to its initial orientation. The neck 4 is made sufficiently narrow so that it will not tear as the head is turned through ninety degrees.

The cage feeder of FIG. 1 may be mounted to a vertical bar cage (i.e., a cage having vertical bars spaced to prevent egress of an animal caged therein with a few horizontal support bars welded thereto in order to support the vertical bars) as follows. The enlarged heads 6 of tabs 3 may be deflected by canting them (with the cant such that the necks are twisted less than their resilient limits) in order to reduce the horizontal distance that the heads extend. Optionally, the sides 8 and 10 of the heads may be pinched so as to further reduce the horizontal distance that the heads extend. The deflected heads may then be pushed between adjacent vertical bars of the cage and released. As the base 12 of each head passes the vertical bars the heads will snap back to their initial position and shape. The result is shown in FIG. 2 with adjacent vertical bars 20 positioned on either side of the neck of each tab so that such adjacent vertical bars are sandwiched between the base 12 of a head and the cup 2. The feeder may then be lowered to rest on a horizontal support bar 22 of the cage.

Figure 3:
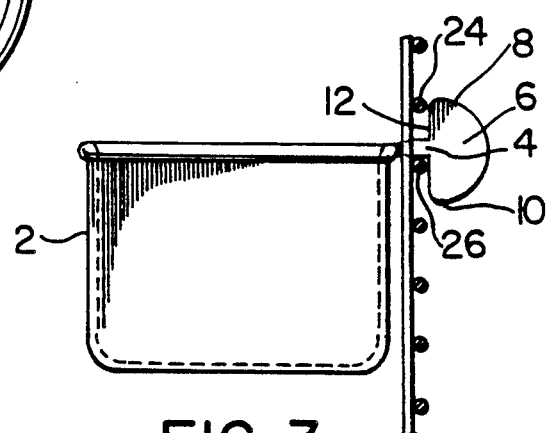
FIG. 3 is a side view of the feeder of FIG. 1 showing the feeder mounted to a horizontal bar cage.

In order to mount the cage feeder to a horizontal bar cage (i.e., a cage having horizontal bars spaced to prevent egress of an animal caged therein with a few vertical support bars welded thereto in order to support the horizontal bars), the three tabs 3 may be inserted between two adjacent horizontal bars and each head 6 turned through ninety degrees to twist its neck beyond the resilient limit of the neck so that the head retains its new orientation. The cage feeder may then be lowered to rest on the lower of the adjacent horizontal bars. The result is illustrated in FIG. 3 with the enlarged transverse dimension of the head 6 between sides 8 and 10 of the head now vertically directed so that adjacent horizontal bars 24 and 26 are sandwiched between the base 12 of the heads and the cup 2 and are positioned on either side of the necks 4 of the tabs 6. The necks 4 of the cage feeder rest on horizontal bar 26. It will be noted that the head 6 is sized so that the distance between the side of the neck resting on bar 26 and side 8 of the head is greater than the vertical distance between the adjacent horizontal bars 24 and 26.

Figure 4:
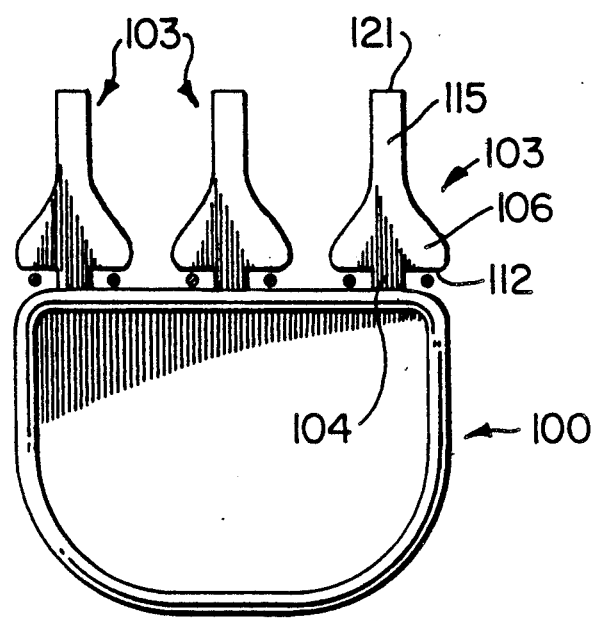
FIG. 4 is a plan view of another embodiment of a feeder made in accordance with this invention shown mounted to a vertical bar cage.

FIG. 4 illustrates a second embodiment of the invention wherein each tab 103 of the cage feeder 100 comprises a neck 104 attached at one end to feed cup 102 and at its other end to head 106. Head 106 is enlarged transversely of the neck 104 and has a tongue 115 extending from its top. The distance between the base 112 of the head and the tip 121 of the tongue is chosen so as to be greater than the vertical distance between adjacent horizontal bars in a horizontal bar cage with which the feeder is intended to be used. The tabs 103 are resilient.

The feeder 100 may be mounted to a vertical bar cage, as illustrated in FIG. 4, in the same manner as the feeder 1 of FIGS. 1 and 2.

Figure 5:
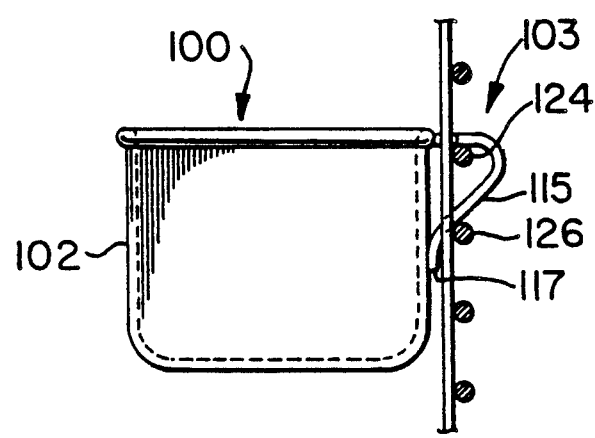
FIG. 5 is a side view of the feeder of FIG. 4 shown mounted to a horizontal bar cage.

As illustrated in FIG. 5, in order to mount the feeder 100 to a horizontal bar cage, the tabs 103 are inserted over a horizontal bar 124 and flexed around this bar and over the top of the adjacent lower horizontal bar 126. Due to the resilience of the tabs, tongue 115 presses against bar 126; the free end 117 of the tongue 115 may be deflected by, and press against, the side of the feed cup 102, as illustrated in FIG. 5. In the result, the feeder is mounted and stabilised on the horizontal bar cage by the tabs 103.

The cage feeder of this invention is particularly adapted to use as a bird cage feeder. Due to its construction, the feeder may be integrally formed of an inexpensive resilient plastic material and is therefore usable as a disposable feeder.

I claim:

1. A small animal cage feeder comprising:
    a feed holding means;
    at least one resilient protrusion extending from said feed holding means comprising a neck joined at one end to said feed holding means and terminating at its other end in the base of an enlarged head, said head enlarged transversely of said neck so as to have a greater extent from side to side than the distance between adjacent horizontally spaced vertical bars in a vertical bar cage with which the cage feeder is intended to be used and so that the distance, transversely of said neck, between one side of said neck and the more distal side of said head is greater than the distance between adjacent vertically spaced horizontal bars in a horizontal bar cage with which the cage feeder is intended to be used;
    said neck having a resilient limit and said head being turnable about a central longitudinal axis of said neck so as to enable one to twist said neck beyond its resilient limit in order to reorientate said head with respect to said feed holding means;
    whereby, in a vertical bar animal cage, the enlarged head of said at least one protrusion may be deflected to snap between adjacent horizontally spaced vertical bars so that such bars are positioned on either side of the neck of said at least one protrusion and are sandwiched between the base of the enlarged head and the feed holding means and thereafter the animal cage feeder may be lowered so that said neck rests on a horizontal support bar of the cage;
    and whereby, in a horizontal bar animal cage, said at least one protrusion may be inserted between two vertically spaced horizontal bars an rested upon the lower of the two horizontal bars and the enlarged head turned about said axis of said neck to twist said neck beyond its resilient limit so that said head has a new orientation which is such that said two horizontal bars are positioned on either side of the neck of said at least one protrusion and are sandwiched between the base of the enlarged head and the feed holding means.

2. The small animal cage of claim 1 wherein said feed holding means has a mouth and wherein the transverse enlargement of each head is in a plane parallel to said mouth and wherein said resilient limit of said neck is exceeded when said neck is twisted through ninety degrees.

3. The small animal cage feeder of claim 1 wherein said enlarged head has a half circular outline so as to have a straight line section and an arcuate section, said base of said head comprising said straight line section.

4. The small animal cage feeder of claim 1 wherein said resilient protrusion is made of polyvinyl chloride.

5. A small animal cage feeder comprising:
    a feed holding means having a base;
    at least one resilient protrusion extending from said feed holding means above said base of said feed holding means comprising a neck joined at one end to said feed holding means and terminating at its other end in an enlarged head, said head joined to said neck at its base and terminating in a tip opposite said base, said head enlarged transversely of said neck so as to extend further than the distance between adjacent horizontally spaced vertical bars in a vertical bar cage with which the cage feeder is intended to be used and said at least one protrusion having a greater length from the base of the head to the tip of the head than the distance between adjacent vertically spaced horizontal bars in a horizontal bar cage with which the cage feeder is intended to be used;
    whereby, in a vertical bar animal cage, the enlarged head of said at least one protrusion may be deflected to snap between adjacent vertical bars so that such bars are positioned on either side of the neck of said at least one protrusion and are sandwiched between the base of the enlarged head and the feed holding means and thereafter the animal cage feeder may be lowered so that said neck rests on a horizontal support bar of the cage with the base of said feed holding means resting against the cage bars;
    and whereby, in a horizontal bar animal cage, said at least one protrusion may be placed over a horizontal bar and flexed around said horizontal bar and over the top of a lower horizontal bar in order to mount the feeder to a horizontal bar animal cage.

6. The small cage feeder of claim 5 wherein said resilient protrusion is made of polyvinyl chloride.

7. An integrally formed small animal cage feeder comprising:
    a feed cup;

at least one resilient tab extending from one side of said feed cup comprising a narrow neck joined to said feed cup and terminating in an enlarged head, said head joined to said neck at its base and terminating in a tip opposite said base, said head enlarged transversely of said neck so as to extend along a side of said feed cup and to extend further than the distance between adjacent horizontally spaced vertical bars in a vertical bar cage with which the cage feeder is intended to be used and said at least one tab having a greater length from the base of the head to the tip of the head than the distance between adjacent vertically spaced horizontal bars in a horizontal cage with which the cage feeder is intended to be used;

whereby, in a horizontal bar animal cage, said at least one tab may be placed over a horizontal bar and flexed around said horizontal bar and over the top of and beyond the adjacent lower horizontal bar in order to mount the feeder to a horizontal bar animal cage;

and whereby, in a vertical bar animal cage, the enlarged head of said at least one tab may be deflected to snap between adjacent horizontally spaced vertical bars so that such bars are positioned on either side of the neck of said at least one tab and are sandwiched between the enlarged head and the feed cup and thereafter the animal cage feeder may be lowered so that said neck rests on a horizontal support bar of the cage.

8. A small animal cage feeder as described in claim 7 wherein said enlarged head comprises a resilient tongue projecting therefrom opposite said neck whereby, in a horizontal bar animal cage, said at least one tab may be placed over a horizontal bar and flexed around said horizontal bar with said tongue extending over top of the adjacent lower horizontal bar in order to mount the feeder to the cage.

9. The small animal cage feeder of claim 7 wherein said cage feeder is made of polyvinyl chloride.

* * * * *